United States Patent [19]

Zuest

[11] 4,028,260

[45] June 7, 1977

[54] LIQUID FOR A FEELER ELEMENT FOR THE ELECTRICAL MEASUREMENT OF INCLINATIONS

[75] Inventor: Harry Zuest, Erlenbach, Switzerland

[73] Assignee: Contraves AG, Zurich, Switzerland

[22] Filed: Dec. 15, 1975

[21] Appl. No.: 640,879

Related U.S. Application Data

[63] Continuation-in-part of Ser. No. 534,654, Dec. 19, 1974, abandoned.

[30] Foreign Application Priority Data

Jan. 17, 1974 Switzerland .................. 606/74

[52] U.S. Cl. .................. 252/62.2; 33/366; 200/234; 252/408; 338/222; 252/500
[51] Int. Cl.² .................. G01C 9/06
[58] Field of Search ........... 252/62.2, 408 R, 500; 200/233, 234; 338/44, 222; 33/366

[56] References Cited

UNITED STATES PATENTS

| | | | |
|---|---|---|---|
| 2,387,313 | 10/1945 | Wilson | 252/62.2 X |
| 2,852,646 | 9/1958 | Broadley | 252/62.2 X |
| 2,932,809 | 4/1960 | Schoeppel et al. | 252/62.2 X |
| 3,227,984 | 1/1966 | Halliday | 252/62.2 X |
| 3,293,395 | 12/1966 | Halliday | 252/62.2 X |
| 3,843,539 | 10/1974 | Willing et al. | 252/62.2 |

OTHER PUBLICATIONS

Lange "Handbook of Chemistry" 10th edition, 1967, pp. 272, 273.

*Primary Examiner*—Jack Cooper
*Attorney, Agent, or Firm*—Werner W. Kleeman

[57] ABSTRACT

A liquid for a level or a feeler element for the electrical measurement of inclinations and for the determination of the vertical by measuring an electrical current or impedance between surface electrodes, which current or impedance changes as a function of tilting, the electrodes being in contact with the liquid which is contained in a container and each electrode is connected with an electrode terminal which can be contacted from the outside. The liquid contains a major proportion, i.e. at least about 50 percent by weight of hydrazine monohydrate and an effective amount of at least one compatible conducting salt dissolved in said liquid.

10 Claims, No Drawings

LIQUID FOR A FEELER ELEMENT FOR THE ELECTRICAL MEASUREMENT OF INCLINATIONS

CROSS-REFERENCE TO RELATED CASE

This application is a continuation-in-part of my commonly assigned, co-pending United States application Ser. No. 534,654, filed Dec. 19, 1974 now abandoned.

BACKGROUND OF THE INVENTION

The present invention relates to a liquid for a level or feeler element for the electrical measurement of inclinations and for the determination of the true vertical in the case of stationary bodies and the apparent vertical in the case of moving bodies. In particular, the invention is concerned with a liquid for a feeler element for the determination of the vertical by measuring an electrical current or impedance, respectively between surface electrodes, the electrical current or impedance changing as a function of the tilting, and the electrodes being in contact with the liquid contained in a container and each electrode is coupled with a respective electrode terminal or connection which can be contacted from the outside. Such type of feeler element has been disclosed in the commonly assigned copending U.S. application Ser. No. 526,788 filed Nov. 25, 1974, now abandoned listing as one of the co-inventors Harry Zuest, the inventor of this application, and entitled "Feeler Element For The Electrical Measurement Of Inclinations", the disclosure of which is incorporated herein by reference.

Depending upon the use of the level or feeler element the most different requirements are imposed thereon. Technical data which is particularly to be taken into account and which is in direct relationship with the physical properties of the liquid among other things are: the useful temperature range, which is limited by freezing, boiling, the change in conductivity, the surface tension, the viscosity and so forth; the build-up time of the gas bubble in the feeler element which, at a given temperature, among other things is dependent upon the viscosity and the surface tension; and the impedance or resistance between electrodes which for a given temperature among other things is dependent upon the conductivity of the liquid or electrolyte. Furthermore, the liquid should have storability and stabilty.

Prior art liquids of the type indicated are known which, under standard conditions of use (for instance: room temperature, slow tilting, no jarring during the measurements) satisfy the requirements, to wit: sulfuric acid, ethanol (as taught in U.S. Pat. NO. 3,409,993), alcoholic solutions, such as 0.08 grams NaI in 100 ml ethanol (according to U.S. Pat. No. 2,713,726), 0.5 grams NaI in 40 grams methanol (according to German patent publication 1,228,428), 0.02 Moles Mg $(NO_3)_2.6(H_2O)$ in 95% ethanol (according to British Pat. No. 733,973), LiCl in ethanol or isopropanol (according to U.S. Pat. No. 3,497,950), or an iodide in N-butanol (according to U.S. Pat. No. 3,020,506). Further liquids or electrolytes are disclosed in U.S. Pat. Nos. 2,387,313; 2,852,646; 2,932,809; 3,227,984; 3,293,395; 3,293,396 and 3,843,539.

These and similar known liquids possess some drawbacks, e.g. their tendency to electrolytic decomposition and aging thus imposing the use of noble metals as the material of the electrodes, otherwise corrosion effects appear at the electrodes which impair the longevity of the feeler elements. A limitation to the sole use of noble metals is, however, to be avoided; in the case of metallic parts, among other reasons because of costs, in the case of thin films, for instance, as taught in the aforementioned copending, commonly assigned U.S. application Ser. No. 526,788, because of their insufficient adherence.

It is known to suppress the susceptibility to corrosion of metallic parts in contact with aqueous salt-containing solutions by adding to the solution a base. The same holds true for mixtures of water and organic substances as such are used, for instance, in the cooling systems of motor vehicles. It is obvious in the case of the state-of-the-art level liquids to suppress the corrosion of metals in the same manner, i.e. by the addition of substances which act as bases in the solution, where possible with a buffer effect (for instance sodium salts of picric acid or organosiloxane). The result tends to be unsatisfactory. Although it is possible to obtain suitable values for the conductivity and the temperature range, yet it is not possible to adjust the build-up time to that value necessary for fields of application imposing high requirements, for instance for determining the apparent vertical in the case of traveling railroad cars and aircraft, for leveling of aiming or sighting devices on ships and traveling armored vehicles or tanks, and generally for fields of application where shaking or jarring effects must be taken into account.

Another possible measure for preventing corrosion is to use as the solvent a reducing and acid-binding organic liquid. There come under consideration by way of example the following: hydroxyl amines, primary to quaternary alkyl amines and hydroxyl alkyl amines, aromatic amines, and even nitriles, the decomposition of which at the electrodes can act in a manner to bind or neutralize acids. But even here the results are partially unsatisfactory: with the aid of water- and/or alcohol additives it is possible to separately attain acceptable values for the conductivity and the temperature range, but it was not possible to obtain a balance of optimum conductivity, temperature range and build-up times suitable for the aforementioned fields of application. In addition surface tensions obtained in this manner tend to be too low so as to unfavorably affect the shape of the gas bubble and to cause the prolonged adherence of the gas bubble in a previous position.

SUMMARY OF THE INVENTION

Hence, it is a primary object of the present invention to provide an improved liquid for a level or feeler element for the electrical measurement of inclinations which is not associated with the aforementioned drawbacks and limitations of the prior art proposals.

Another and more specific object of the present invention aims at the provision of a liquid for a level or feeler element which, with respect to the physical properties and especially with regard to the surface tension, affords more favorable values than the prior art liquids, and which still does not cause corrosion effects at the electrodes even if the same are formed of such metals as iron, nickel, cobalt and other heavy metals, such as chromium, or of alloys of such metals.

DETAILED DESCRIPTION OF THE INVENTION

Surprisingly it has been found that the properties of hydrazine monohydrate as solvent, when used with a conducting salt in a level or a feeler element, are almost optimum: viscosity and surface tension possess favorable values that can be adapted to a given purpose without difficulty by the addition of diluting- and/or wetting agents. After the addition of conducting salts the conductivity is surprisingly high, and there do not occur any corrosion effects upon the non-noble metals mentioned above.

According to the invention the liquid for a level or feeler element contains a major proportion i.e. at least 50 percent by weight of hydrazine monohydrate, and at least one conducting salt dissolved in said liquid.

Thus, the first essential component of the inventive liquid is hydrazine monohydrate (formula $H_2N$ — $NH_2 \cdot H_2O$) or HMH for short, a strongly refractive liquid freezing at $-40°$ C and boiling at $118.5°$ C (both temperatures for normal pressure). For inorganic salts it has a high dissolving power similar to that of liquid $NH_3$. It is capable of dissolving the typical conducting salts discussed more in detail below but has some electrically conductivity even in the absence of such a salt.

Specifically, the conductivity of HMH at room temperature($20° - 25°$ C) is in the order of about 500 microohms$^{-1} \cdot$ cm$^{-1}$. If HMH contains small quantities of water, such as humidity taken up from ambient air within 2 or 3 hours, the conductivity rises to 1000–1500 microohms$^{-1} \cdot$cm$^{-1}$.

While HMH is available as commercial product in various grades it is preferred for the purposes of this invention, i.e. for the combination of HMH with a conductive salt and, optionally, with a diluent and a wetting agent to use a substantially pure HMH i.e. "purissimum" or "analytical" grade.

It is to be emphasized that while the inventive liquid does include an effective quantity of at least one conducting salt as a critical second component and may include a diluent and/or wetting agent as optional further constituents, the essential feature of this invention resides in the provision of a liquid for the purposes indicated above containing a major portion, i.e. at least about 50 percent by weight of HMH. As the relative volume portion of an effective amount of conducting salt or salts dissolved in the liquid may be very small, say in the range of from a fraction of one percent to a few percents by weight, the inventive liquid may contain up to 99 percent by weight or even 99.9 percent by weight of HMH with the balance of the liquid consisting of conducting salt dissolved in HMH.

In other words, if the liquid or electrolyte is understood to consist of a solvent portion and a solute portion, the solvent portion of the liquid may consist entirely of HMH. As will be explained below, inert liquid diluents may be used in combination with HMH so as to constitute another portion of the solvent and, as an example, the total liquid (including the dissolved conducting salt) may contain 50–90 percent by weight, e.g. 80 ± 5 percent by weight of HMH, if such optional constituents are used.

As indicated above, the second essential constituent of the inventive liquid is a conducting salt as a solute in the solvent component of the liquid.

According to the *IEEE Standard Dictionary of Electrical and Electronic Terms*, J. Wiley, New York, 1972, conducting salts are substances that, when added to a specific solvent or solution, materially increase the conductivity thereof. It should be emphasized that the use of such salts in solutions or electrolytes for feeler elements of the type indicated is well known in the art, e.g. the patents mentioned above, as are the criteria for selecting an effective amount or concentration of such solute. In view of the high dissolving capacity of HMH, typical and conventional conducting salts selected from the halide salts of alkali and earth alkali metals, as well as salts of ammonia, can be used in conventional quantities, e.g. from about 0.1 percent by weight to about 5 percent by weight or more depending upon the specific salt, singly or in combination of two or more of such salts. It seems that no specific critical lower and upper limits (short of a solubility limit) exist in that even very low concentrations of the solute may provide a cell conductance suitable for a specific purpose. As is well known, conductance (measured conveniently in ohm-s$^{-1}$) is the reciprocal value of resistance (measured in ohms) so that the conductivity (measured in ohms$^{-1} \cdot$ unit of length$^{-1}$, e.g. ohms$^{-1} \cdot$cm$^{-1}$) or "specific conductance" of an electrolyte or feeler liquid is but one of the parameters that determine the resistance of the complete feeler element or cell including such liquid. For example, other essential parameters that influence the resistance of the feeler element plus liquid are the geometry of the cell, the electrode surface area, the operating temperature, etc. For that reason, no general lower and upper limits can be said to be critical for the conductivity or specific conductance (the reciprocal value of resistivity or specific resistance) of the inventive liquid. In view of this, it is established in the art that the concentration of the conducting salt in the solvent is not normally a critical parameter and cannot, therefore, be defined within a specified range but is a matter of choice with due regard to such factors as the conductance desired between the electrodes under different temperature conditions and the possibility that very high concentrations of a given solute may cause the salt to crystallize out and affect the characteristics of the level or feeler element. In this connection, it is to be noted that more than one salt may be used as the solute in the inventive liquid so as to increase, if desired, the conductivity without approaching a limiting solubility of a single conducting salt.

In general, however, concentrations of at least about 0.1 percent by weight of the conductive salt will constitute an effective amount for practical use when employing one of the typical conducting salts because, at such levels, they will commence to substantially increase the inherent conductivity of pure HMH. On the other hand, some conductive salts that are quite suitable at concentrations of well below 10 percent by weight may reach a solubility limit in HMH at a desired operating temperature of the feeler element.

Thus, while operative embodiments may be found outside of the mentioned limits, a range of from at least about 0.1 percent by weight of the total amount of conducting salt dissolved in the solvent to not more than about 10 percent by weight of a single conducting salt present in the liquid is preferred for practical reasons, all percentages being based upon the weight of the total liquid (solvent plus solute). Some conducting salts can be used in even greater amounts if required. Expressed in terms of the resistivity of the liquid, an effective amount or concentration of conducting salt will be a portion that yields a liquid (solvent plus solute) having a resistivity in the order of some tens ohms·cm to several thousands ohms·cm, typically in the order of from about 50 to about 3000 ohms·cm.

While many conventional conducting salts disclosed in the art are suitable for the invention, anhydrous salts of a strong monovalent acid, such as hydrogen halide, and a strong monovalent base, such as the hydroxides of alkali metals, constitute a preferred group, the halide salts of alkali metals, notably the iodides, bromides and chlorides of potasssium, lithium and sodium being particularly preferred. Potassium iodide is most preferred.

Other types of salts, such as quanternary ammonium compounds or the hydrochloride salt formed by reacting HMH with hydrochloric acid or another acid or acid salt may be suitable as conducting salt for specific purposes but are not normally preferred.

In general, conducting salts suitable for the practice of this invention are substantially neutral, normally solid and substantially an hydrous ionic substances or "ionogens" compatible with HMH.

The term "compatible with HMH" is used herein to refer to a solid or liquid substance that is both chemically inert in combination with HMH and capable of being dissolved therein or mixed therewith in a desired concentration. This term is used both in connection with the salt and with the optional constituents. As there is virtually an infinite number of combinations of the essential and optional components of the inventive liquid, it is impractical to give the details including compatibility characteristics for each and every combination but it is well within the experts' capacity to establish compatibility of any component in a given combination of constituents in HMH by means of simple tests.

As indicated, the inventive liquid may contain one or more diluents ("co-solvents"). The use of co-solvents or diluents is conventional in liquids for feeler elements and such prior art diluents can be used, as a portion of the liquid, in combination with HMH, e.g. to decrease its viscosity if this is desired provided that the diluent is compatible with HMH, i.e. is chemically inert therein and miscible therewith. The amount of diluent used should not render the desired solute insoluble in the liquid.

Suitable diluents are non-aqueous organic liquids (i.e. liquid at ambient conditions) that are compatible, i.e. do not react with HMH and are miscible therewith, e.g. monoalcohols such as alkanols, dialcohols or glycols, such as the alkane diols, ketones such as the alkanones, esters, such as alkylesters and HMH-miscible ethers, such as glycol ethers. Low moleculr alkanols, preferably those with an unbranched alkyl group, are preferred. While $C_1$-$C_6$ alkyls are generally suitable, alkyls with up to 12 C-atoms may be used for special purposes. Methanol and ethanol are particularly preferred diluents.

With the criterion of compatibility in mind, further examples of suitable non-aqueous diluents may be selected from prior art patents, e.g. U.S. Pat. Nos. 2,387,313; 2,852,646; 2,932,809; 3,227,984; and 3,843,539, the disclosures of which are incorporated herein by reference. Mixtures of two or more diluents may be used.

In view of the optional character of the diluent and the fact that HMH makes up at least 50 percent by weight of the inventive liquid, the diluent, or mixture of diluents, will constitute an amount of from zero to less than 50 percent by weight of the liquid. The combined volume percentages of the dissolved conductive salt and the optional wetting agent will generally be small, e.g. below 5 percent by volume, and typically in the order of 1 to 2 percent by volume. As the specific weights of HMH and the preferred diluents approach unity the diluent preferably can be said to constitute from zero to about 48 percent by weight, an amount of 20 ± 5 percent by weight being even more preferred.

The inventive liquid may include one or more wetting agents as a further optional component. Suitable examples can be selected from the broad class of non-ionic surface active agents that are compatible with HMH, e.g. alkyl polyglycol ethers, such as the dodecyl ether of hexaethylene glycol and the 1-pentyl nonyl ether of hexaethylene glycol; amine oxides, such as the dimethyl dodecyl amine oxide, and perfluoroalkyl sulfonic compounds, e.g. the corresponding amines, amides or sulfonates, such as the 1-dimethyl-amino 3-perfluorooctylsulfonate of aminopropane.

If the wetting agent used is a solid, it may be incorporated into the inventive liquid as a prepared solution in an organic diluent of the type set forth above. It is not required that the diluent used as solvent for the optional wetting agent is the same as the diluent that constitutes the other optional constituent of the inventive liquid.

The amount of wetting agent should be effective to achieve a desired wetting effect and the inventive liquid may contain, for example, up to about 1 percent by weight of wetting agent. In general, fractions of 1 percent will be satisfactory, e.g. 0.1 to 0.01 percent by weight of wetting agents of the type specified above.

The following examples are for illustration, not limitation. Unless otherwise noted, percentages are by weight, based upon the total of the invention liquid.

EXAMPLE I

Increasing amounts of potassium iodide were dissolved in a sequence of samples of hydrazine monohydrate. The conductivities of the resulting solutions were measured at 22° C and combined in a diagram. The results are shown in the following Table 1.

Table 1

| Percentage by weight of KI dissolved in HMH | Conductivity at 22° C (Milliohms$^{-1}$·cm$^{-1}$) |
|---|---|
| 0 (control) | 0.04 |
| 0.5 | 0.9 |
| 1.0 | 3.5 |
| 3.0 | 9.9 |
| 5.0 | 15.7 |
| 7.5 | 22.8 |
| 10.0 | 29.8 |

These results show a very advantageous and substantially linear increase of the conductivity of KI solutions in HMH and such solutions are suitable as inventive liquids.

EXAMPLE II

Example I was repeated except that potassium chloride was used as the conducting salt. Again the increase of conductivity was substantially linear and a conductivity of about 21 milliohms$^{-1}$·cm$^{-1}$ was obtained at a KCl-concentration of about 3 percent.

EXAMPLE III

As inventive liquid was prepared consisting of about 80 percent HMH, 1 percent potassium iodide, 0.04 percent dodecyl ether of hexaethylene glycol with the balance (about 19 percent) consisting of ethanol. The liquid was prepared by dissolving KI (0.5 g) in HMH (40 ml), adding abut 0.5 ml of a 4 percent solution of the wetting agent in ethanol and then adding ethanol in the amount required for a total volume of 50 ml of liquid.

With this liquid and a feeler element, for instance of the type disclosed in Example III of the aforementioned United States application Serial No. 526,788 the following technical data was obtained: the resistance between the base and feeler electrodes in the normal position of the feeler element = 270 ohms; storage temperature = −50° C to + 70° C; operating temperature = −10° C to + 50° C; build-up time at the region of the operating temperature = 0.2 to 1.5 seconds. Corrosion effects could not be ascertained after a period of time exceeding 100 hours at the thin-film electrodes formed of gold and nickel-chromium alloy as well as at the glass container. Electrodes made of iron metals, i.e. iron, cobalt and nickel and other heavy metals, such as chromium, or of alloys of such metals are not corroded in a significant manner by the inventive liquid.

EXAMPLE IV

Other surface active or wetting agents mentioned above were used in the composition of Example III at equivalent concentrations. Similar results were obtained.

While some preferred embodiments of the invention have been discussed above, it is to be distinctly understood that the invention is not limited thereto but may be otherwise variously embodied and practiced within the scope of the following claims.

Accordingly, what is claimed is:

1. A liquid for a level or feeler element for the electrical measurement of inclinations and for the determination of the vertical by measuring an electrical current between surface electrodes, said liquid consisting essentially of at least about 50 percent by weight of hydrazine monohydrate and an effective amount of at least one conducting salt dissolved therein for increasing the electrical conductivity of said hydrazine monohydrate, said salt being chemically inert with said hydrazine monohydrate.

2. The liquid of claim 1, further containing a non-aqueous organic liquid diluent chemically inert and miscible with said hydrazine monohyrate.

3. The liquid of claim 2, further containing a wetting agent chemically inert and miscible with said hydrazine monohydrate.

4. The liquid of claim 1, consisting of from about 50 percent by weight to about 80 percent by weight of said hydrazine monohydrate, said effective amount of at least one conducting salt dissolved therein, a non-ionic wetting agent in an amount of from about 0.01 percent by weight to about 1 percent by weight, said non-ionic wetting agent being chemically inert and miscible with said hydrazine monohydrate, and a non-aqueous liquid organic diluent chemically inert and miscible with said hydrazine monohydrate as balance.

5. The liquid of claim 4, consisting of about 80 percent by weight of said hydrazine monohydrate, about 1 percent by weight of said conducting salt, about 0.04 percent by weight of said non-ionic wetting agent, and said diluent as balance.

6. The liquid of claim 3, wherein said wetting agent is selected from the group consisting of alkyl polyglycol ethers, amine oxides and perfluoroalkyl sulfonic compounds.

7. A liquid for a level or feeler element for the electrical measurement of inclinations and for the determination of the vertical by measuring an electrical current between surface electrodes, said liquid consisting essentially of at least 50 percent by weight of hydrazine monohydrate and at least 0.1 percent by weight of conducting salt soluble in hydrazine monohydrate and dissolved therein, the respective percentages of hydrazine monohydrate and of conducting salt balancing each other to 100 percent.

8. A liquid for a level or feeler element for the electrical measurement of inclinations and for the determination of the vertical by measuring an electrical current between surface electrodes, said liquid consisting essentially of at least 50 percent by weight of hydrazine monohydrate, a non-aqueous organic liquid diluent miscible and chemically inert with respect thereto and mixed therewith to form a mixture, and at least 0.1 percent by weight of conducting salt soluble in the mixture and dissolved therein, the percentage by weight of said non-aqueous organic liquid diluent constituting the balance 9. A liquid for a level or feeler element for the electrical measurement of inclinations and for the determination of the vertical by measuring an electrical current between surface electrodes, said liquid consisting essentially of at least 50 percent by weight of hydrazine monohydrate, a non-aqueous organic liquid diluent miscible and chemically inert with respect thereto and mixed therewith to form a mixture, at least 0.1 percent by weight of conducting salt soluble in the mixture and dissolved therein, and up to 1 percent by weight of a non-ionic wetting agent chemically inert and miscible therewith, said non-ionic wetting agent being selected from the group consisting of alkyl polyglycol ethers, amine oxides and perfluoroalkyl sulfonic compounds, the percentage by weight of said nonaqueous organic liquid diluent constituting the balance to 100 percent with respect to the sum of the other percentages.

10. The liquid of claim 9, consisting essentially of 50 to 80 percent by weight of hydrazine monohydrate, at least 0.1 percent by weight of said conducting salt, 0.01 to 1 percent by weight of said wetting agent and said non-aqueous organic liquid diluent constituting the balance to 100 percent.

* * * * *